(12) United States Patent
Yen et al.

(10) Patent No.: US 12,445,544 B2
(45) Date of Patent: *Oct. 14, 2025

(54) FOLDABLE ELECTRONIC DEVICE

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 367 days.

This patent is subject to a terminal disclaimer.

(21) Appl. No.: 18/314,754

(22) Filed: May 9, 2023

(65) Prior Publication Data

US 2024/0171663 A1 May 23, 2024

Related U.S. Application Data

(60) Provisional application No. 63/427,327, filed on Nov. 22, 2022.

(30) Foreign Application Priority Data

Feb. 3, 2023 (TW) ................................ 112200992

(51) Int. Cl.
*H04M 1/02* (2006.01)

(52) U.S. Cl.
CPC ....... *H04M 1/0216* (2013.01); *H04M 1/0268* (2013.01)

(58) Field of Classification Search
CPC .... G06F 1/1681; G06F 1/1652; G06F 1/1616; G06F 1/1641; G06F 1/1656; G06F 1/1624; G06F 1/16; G06F 1/1601; G06F 1/1618; G06F 9/30; G06F 1/1637; G06F 1/1679; G06F 1/1626; G06F 1/1605; G06F 1/162; G06F 1/1688; G06F 1/1698; G06F 2200/1612; G06F 1/1632; G06F 1/166; H04M 1/0268; H04M 1/022; H04M 1/0216; H04M 1/02; H04M 2201/38;

(Continued)

(56) References Cited

U.S. PATENT DOCUMENTS 11,920,395 B2 * 3/2024 Quynh ................. H04M 1/022
2020/0409422 A1 * 12/2020 Wang .................. F16C 11/045

(Continued)

*Primary Examiner* — Golam Sorowar
(74) *Attorney, Agent, or Firm* — Studebaker Brackett PLLC

(57) ABSTRACT

A foldable electronic device is provided and includes a central base, a torque module, two wing members, two transmission members, two panel bodies, a synchronous module and a flexible screen. The torque module is disposed on the central base, the wing members pivot relative to the central base, the transmission members are pivotally connected to the torque module and the central base, the panel bodies pivot relative to the wing members and linearly slide relative to the transmission members, the synchronous module drives the transmission members to reverse synchronously, and the flexible screen is arranged on the panel bodies and the wing members and includes a bendable area. The flexible screen is flattened when the panel bodies are in an unfolded state, and the bendable area bends when the panel bodies are in a folded state.

15 Claims, 11 Drawing Sheets

(58) Field of Classification Search
CPC .. H04M 1/0214; H04M 1/021; H04M 1/0222; H04M 1/0249; H04M 1/0237
See application file for complete search history.

(56) References Cited

U.S. PATENT DOCUMENTS

| | | | |
|---|---|---|---|
| 2023/0353665 A1* | 11/2023 | Han | G06F 1/1681 |
| 2023/0366248 A1* | 11/2023 | Chung | E05D 3/122 |
| 2024/0419221 A1* | 12/2024 | Xu | G09F 9/30 |
| 2025/0048572 A1* | 2/2025 | Shi | F16C 11/04 |
| 2025/0155938 A1* | 5/2025 | Wu | F16C 11/04 |

* cited by examiner

FOLDABLE ELECTRONIC DEVICE

CROSS-REFERENCE TO RELATED APPLICATION

This application claims the benefit of U.S. Provisional Application Ser. No. 63/427,327 filed on Nov. 22, 2022, and the benefit of Taiwan Patent Application Serial No. 112200992 filed on Feb. 3, 2023. The entirety of each Application is incorporated herein by reference.

BACKGROUND

1. Technical Field

The present disclosure relates to a foldable electronic device, and more particularly, to a foldable electronic device having a flexible screen.

2. Description of Related Art

Flexible screens have been widely used in smartphones and tablets. If the structure supporting a flexible screen is poorly designed, it may cause damage to the bendable area of the flexible screen when the flexible screen is folded, or the flexible screen cannot be completely flattened when it is unfolded. These scenarios might cause troubles to users. Although there are linkage structures that provide the yielding spaces required for the bendable area, in the existing linkage structures, however, the corresponding moving distance of the internal elements is long in order to form a large enough yielding space, resulting in an increase in the overall thickness of the shell, causing inconvenience in use.

SUMMARY

The present disclosure provides a foldable electronic device, which comprises: a central base including a body portion, a track portion, a lifting plate, at least one first inner arc-shaped slider and at least one second inner arc-shaped slider, wherein the track portion is formed by extending outward from the body portion, and the first inner arc-shaped slider and the second inner arc-shaped slider are respectively formed on the body portion and spaced apart from each other, wherein the lifting plate is movably disposed on the body portion and is able to transform between a highest position and a lowest position relatively; a torque module disposed on the track portion; a first wing member including at least one first inner arc-shaped slideway and at least one first outer arc-shaped slideway, wherein the first inner arc-shaped slider is slidably disposed on the first inner arc-shaped slideway, whereby the first wing member is able to pivot relative to the body portion with a first inner virtual axis as a center; a first transmission member pivotally connected to the torque module and the body portion; a first panel body including a first carrying member having at least one first outer arc-shaped slider, wherein the first carrying member is able to linearly slide relative to the first transmission member, and the first outer arc-shaped slider is slidably disposed on the first outer arc-shaped slideway, whereby the first carrying member is able to pivot relative to the first wing member about a first outer virtual axis; a second wing member including at least one second inner arc-shaped slideway and at least one second outer arc-shaped slideway, wherein the second inner arc-shaped slider is slidably disposed on the second inner arc-shaped slideway, whereby the second wing member is able to pivot relative to the body portion with a second inner virtual axis as a center; a second transmission member pivotally connected to the torque module and the body portion and spaced apart from the first transmission member; a second panel body including a second carrying member having at least one second outer arc-shaped slider, wherein the second carrying member is able to linearly slide relative to the second transmission member, and the second outer arc-shaped slider is slidably disposed on the second outer arc-shaped slideway, whereby the second carrying member is able to pivot relative to the second wing member about a second outer virtual axis; a synchronous module including a synchronous slider body slidably disposed between the first transmission member and the second transmission member, wherein the first transmission member and the second transmission member are respectively connected to the synchronous slider body, and the synchronous slider body is able to drive the first transmission member and the second transmission member to rotate synchronously and reversely when the synchronous slider body slides; and a flexible screen disposed on the first panel body, the second panel body, the first wing member and the second wing member, and including a bendable area; wherein the first panel body and the second panel body are able to transform between an unfolded state and a folded state, wherein when the first panel body and the second panel body are in the unfolded state, the flexible screen is flattened, the lifting plate is positioned at the highest position, and the first wing member, the second wing member and the lifting plate jointly support the bendable area, wherein when the first panel body and the second panel body are in the folded state, the bendable area of the flexible screen bends, the lifting plate is positioned at the lowest position, and the first wing member, the second wing member and the lifting plate jointly define an yielding space for accommodating the bendable area.

In the aforementioned foldable electronic device, the synchronous module further comprises a first helical protrusion, a second helical protrusion, a first helical groove and a second helical groove, wherein the first helical protrusion is matched to be accommodated in the first helical groove, and the second helical protrusion is matched to be accommodated in the second helical groove.

In the aforementioned foldable electronic device, the first helical groove is recessed and formed on the first transmission member along a first helical direction, the second helical groove is recessed and formed on the second transmission member along a second helical direction, and the first helical protrusion and the second helical protrusion are respectively formed on two opposite sides of the synchronous slider body.

In the aforementioned foldable electronic device, the first helical direction is opposite to the second helical direction.

In the aforementioned foldable electronic device, the first transmission member comprises a first rod, a first extending plate and a first straight slider integrally formed, the first rod is pivotally connected to the torque module and the body portion along a first axis, the first extending plate is formed to extend outwards from the first rod along a radial direction of the first axis, the first straight slider is formed by extending outward from the first extending plate along a direction parallel to the first axis, the first carrying member comprises a first straight sliding groove extending substantially perpendicular to the first axis, and the first straight slider is slidably disposed in the first straight sliding groove, wherein the second transmission member comprises a second rod, a second extending plate and a second straight slider integrally formed, the second rod is pivotally connected to the torque module and the body portion along a second axis, the second extending plate is formed to extend outwards from the second rod along a radial direction of the second axis, the second straight slider is formed by extending outward from the second extending plate along a direction parallel to the second axis, the second carrying member comprises a second straight sliding groove extending substantially perpendicular to the second axis, and the second straight slider is slidably disposed in the second straight sliding groove.

In the aforementioned foldable electronic device, the first axis, the first inner virtual axis, the first outer virtual axis, the second axis, the second inner virtual axis and the second outer virtual axis are parallel to each other and do not overlap.

In the aforementioned foldable electronic device, the torque module comprises a fixed base, a first shaft hole and a second shaft hole, wherein the fixed base has a first wing portion and a second wing portion, the first shaft hole is formed through the first wing portion along the first axis, and the second shaft hole is formed through the second wing portion along the second axis.

In the aforementioned foldable electronic device, the first rod has a first rod body, a first blocking portion and a first extension post, the first blocking portion is formed at one end of the first rod body and abuts against the first wing portion, the first extension post extends outward from the first blocking portion and passes through the first shaft hole, and a cross-sectional area of the first blocking portion is larger than a cross-sectional area of the first extension post, wherein the second rod has a second rod body, a second blocking portion and a second extension post, the second blocking portion is formed at one end of the second rod body and abuts against the second wing portion, the second extension post extends outward from the second blocking portion and passes through the second shaft hole, and a cross-sectional area of the second blocking portion is larger than a cross-sectional area of the second extension post.

In the aforementioned foldable electronic device, the torque module further comprises a first stop washer, a plurality of first bowl-shaped washers, a second stop washer and a plurality of second bowl-shaped washers, wherein the first stop washer is sleeved on the first extension post and moves together with the first extension post, the first bowl-shaped washers are sleeved on the first extension post and constantly provide a first elastic force, and the first elastic force tends to make the first stop washer abut against the first wing portion, wherein the second stop washer is sleeved on the second extension post and moves together with the second extension post, the second bowl-shaped washers are sleeved on the second extension post and constantly provide a second elastic force, and the second elastic force tends to make the second stop washer abut against the second wing portion.

In the aforementioned foldable electronic device, when the first panel body and the second panel body are in the unfolded state, the first carrying member and the second carrying member are substantially 180 degrees apart, wherein when the first panel body and the second panel body are in the folded state, the first carrying member and the second carrying member are substantially 0 degrees apart, wherein when the first panel body and the second panel body are switched between the unfolded state and the folded state, the first transmission member and the second transmission member reverse synchronously, so that the first blocking portion and the first stop washer simultaneously generate friction on opposite sides of the first wing portion, and the second blocking portion and the second stop washer simultaneously generate friction on opposite sides of the second wing portion, such that the first carrying member and the second carrying member are able to stop at any relative position and sandwich an angle between 0 and 180 degrees.

In the aforementioned foldable electronic device, the central base further comprises a track groove formed through the track portion, the synchronous module further comprises a limiting member formed on a bottom surface of the synchronous slider body and accommodated in the track groove, such that the synchronous module is able to move along the track groove.

In the aforementioned foldable electronic device, the first wing member further comprises a first supporting plate, the second wing member further comprises a second supporting plate, and the body portion has an upper surface, wherein when the first panel body and the second panel body are in the unfolded state, the first supporting plate, the second supporting plate and the lifting plate are coplanar, and the lifting plate is spaced apart from the upper surface, wherein when the first panel body and the second panel body are in the folded state, the lifting plate is in contact with the upper surface, the first supporting plate and the second supporting plate are respectively oblique to the body portion, and one end of the first supporting plate adjacent to the first carrying member and one end of the second supporting plate adjacent to the second carrying member are close to each other.

In the aforementioned foldable electronic device, the first wing member further comprises a first abutting portion adjacent to the first inner arc-shaped slideway and exposed from the first supporting plate, and the second wing member further comprises a second abutting portion adjacent to the second inner arc-shaped slideway and exposed from the second supporting plate, wherein the first abutting portion and the second abutting portion jointly abut against the lifting plate at the highest position when the first carrying member and the second carrying member are in the unfolded state, wherein the first abutting portion and the second abutting portion are away from the lifting plate when the first carrying member and the second carrying member are in the folded state.

In the aforementioned foldable electronic device, the central base further comprises at least one screw and at least one elastic member, wherein the screw is clamped on the lifting plate, and the elastic member is embedded in the body portion or the track portion, connected to the screw and constantly provides an elastic force, wherein the elastic force pulls the screw and makes the lifting plate tend to settle towards the lowest position.

In the aforementioned foldable electronic device, the elastic member is a tension spring.

DETAILED DESCRIPTION

Figure 1:
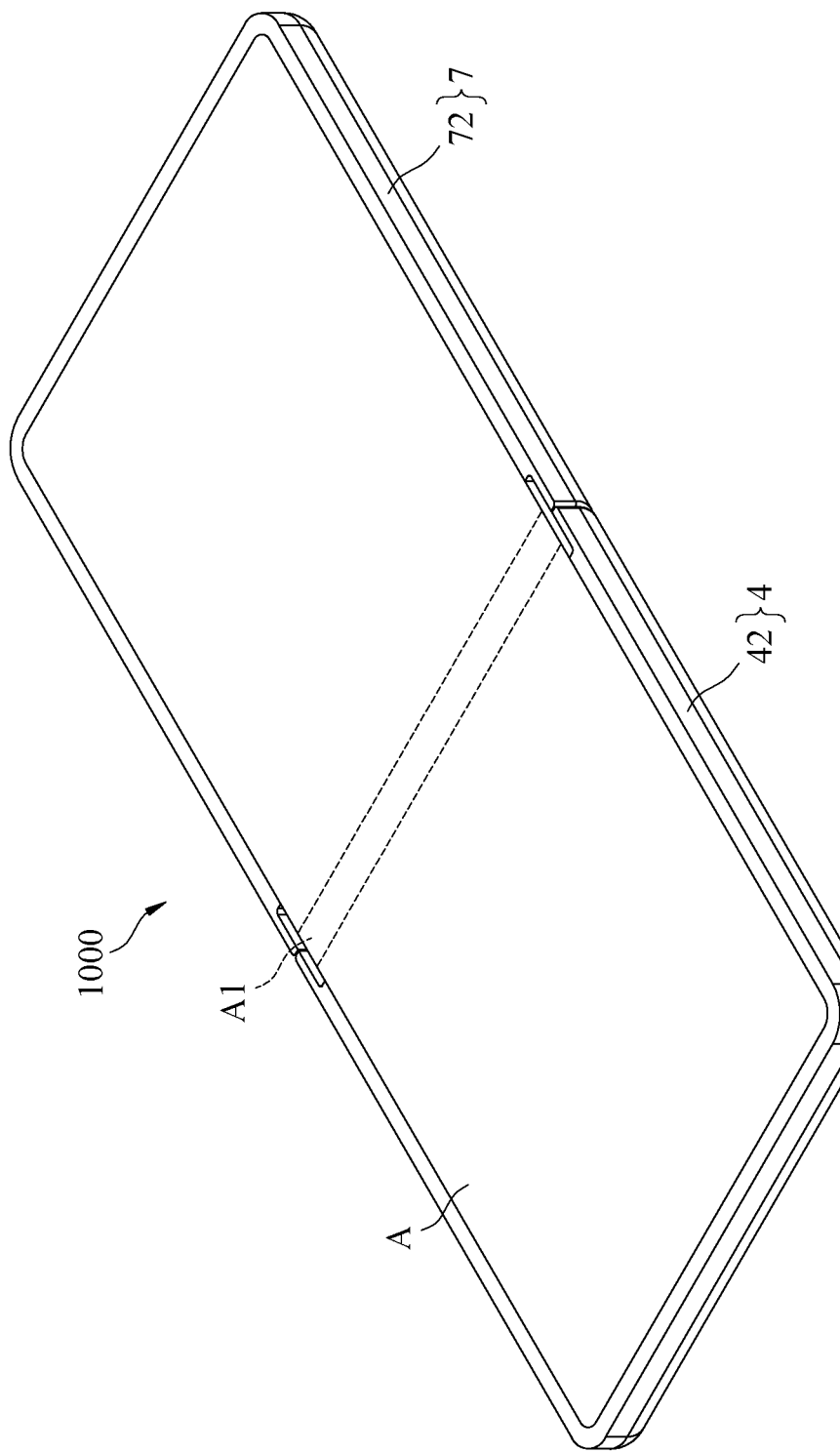
FIG. 1 is a schematic view of a foldable electronic device according to the present disclosure in an unfolded state.
Figure 2:
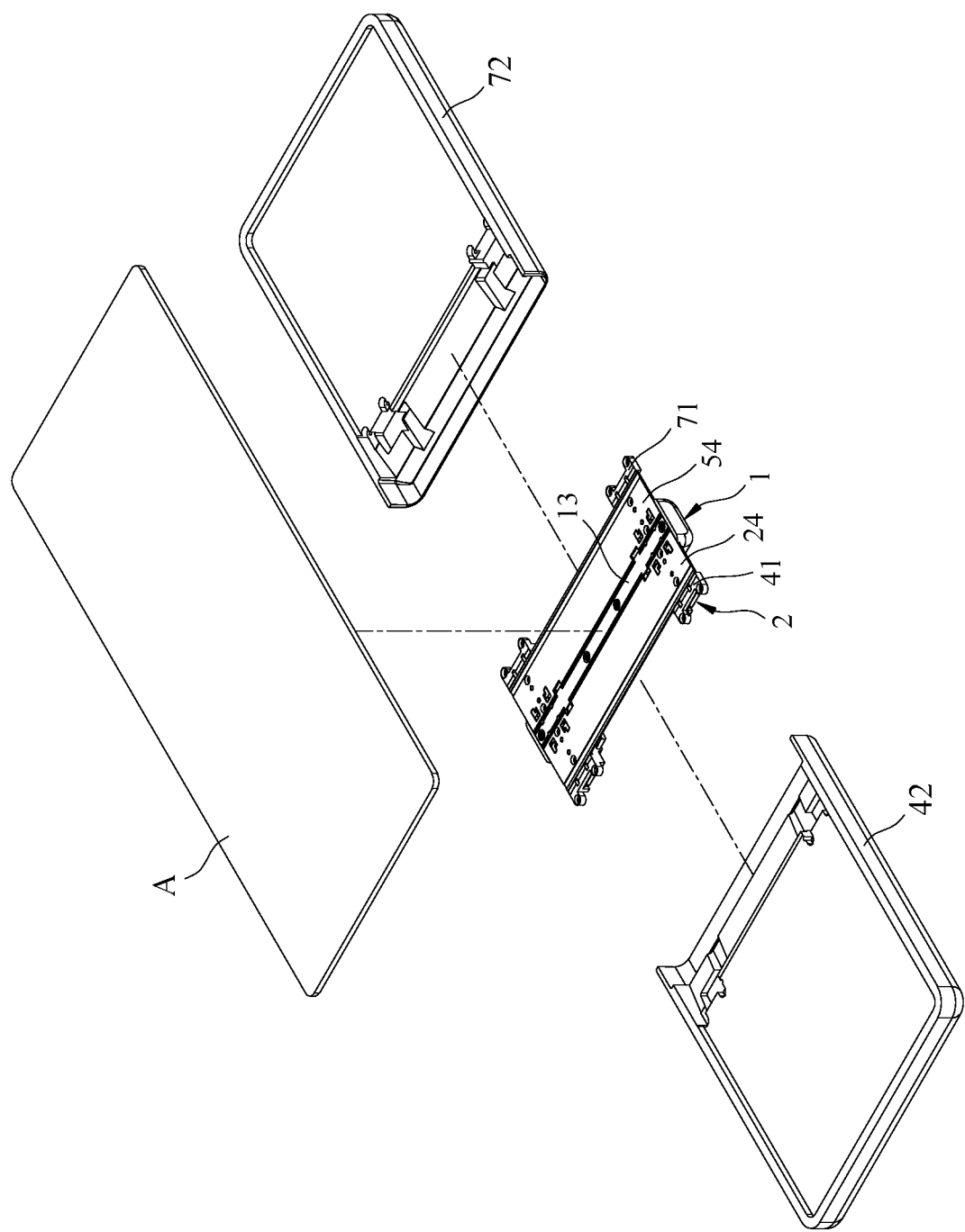
FIG. 2 is a schematic exploded view of the foldable electronic device according to the present disclosure in an unfolded state.
Figure 3:
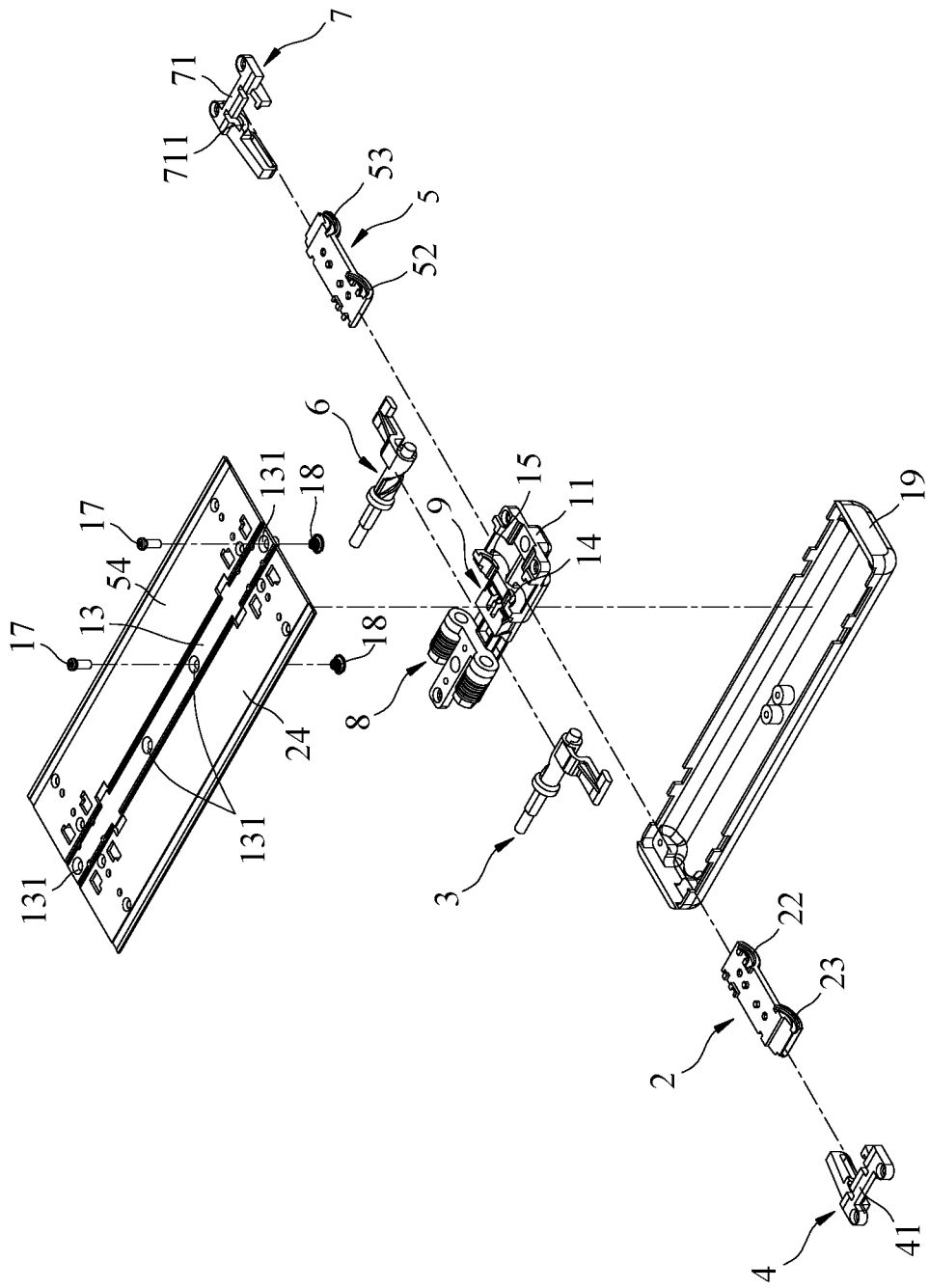
FIG. 3 is a schematic exploded view of some elements of the foldable electronic device according to the present disclosure.

Please refer to FIG. 1, FIG. 2 and FIG. 3, a foldable electronic device 1000 of the present disclosure comprises a central base 1, a first wing member 2, a first transmission member 3, a first panel body 4, a second wing member 5, a second transmission member 6, a second panel body 7, a torque module 8, a synchronous module 9 and a flexible screen A, wherein the first wing member 2 is pivotally connected to the central base 1, the first transmission member 3 is connected to the central base 1 and the torque module 8, the first panel body 4 is connected to the first wing member 2, the second wing member 5 is pivotally connected to the central base 1, the second transmission member 6 is connected to the central base 1 and the torque module 8, the second panel body 7 is connected to the second wing member 5, the torque module 8 is disposed on the central base 1, the synchronous module 9 is slidably disposed between the first transmission member 3 and the second transmission member 6, and the flexible screen A is disposed on the first wing member 2, the first panel body 4, the second wing member 5 and the second panel body 7. The structure of each element and the connection relationship between each other will be described in detail below, wherein part of the drawings are drawn with a first inner virtual axis VXI1, a second inner virtual axis VXI2, a first outer virtual axis VXO1, a second outer virtual axis VXO2, a first axis X1 and a second axis X2 that are parallel to each other and do not overlap. It should be noted that some elements of the foldable electronic device 1000 of the present disclosure may be a group or a plurality of groups. However, whether it is one group or multiple groups, the action effect of the present disclosure can be achieved. The following is a simplified description, and only one group is used as an example.

Figure 5A:
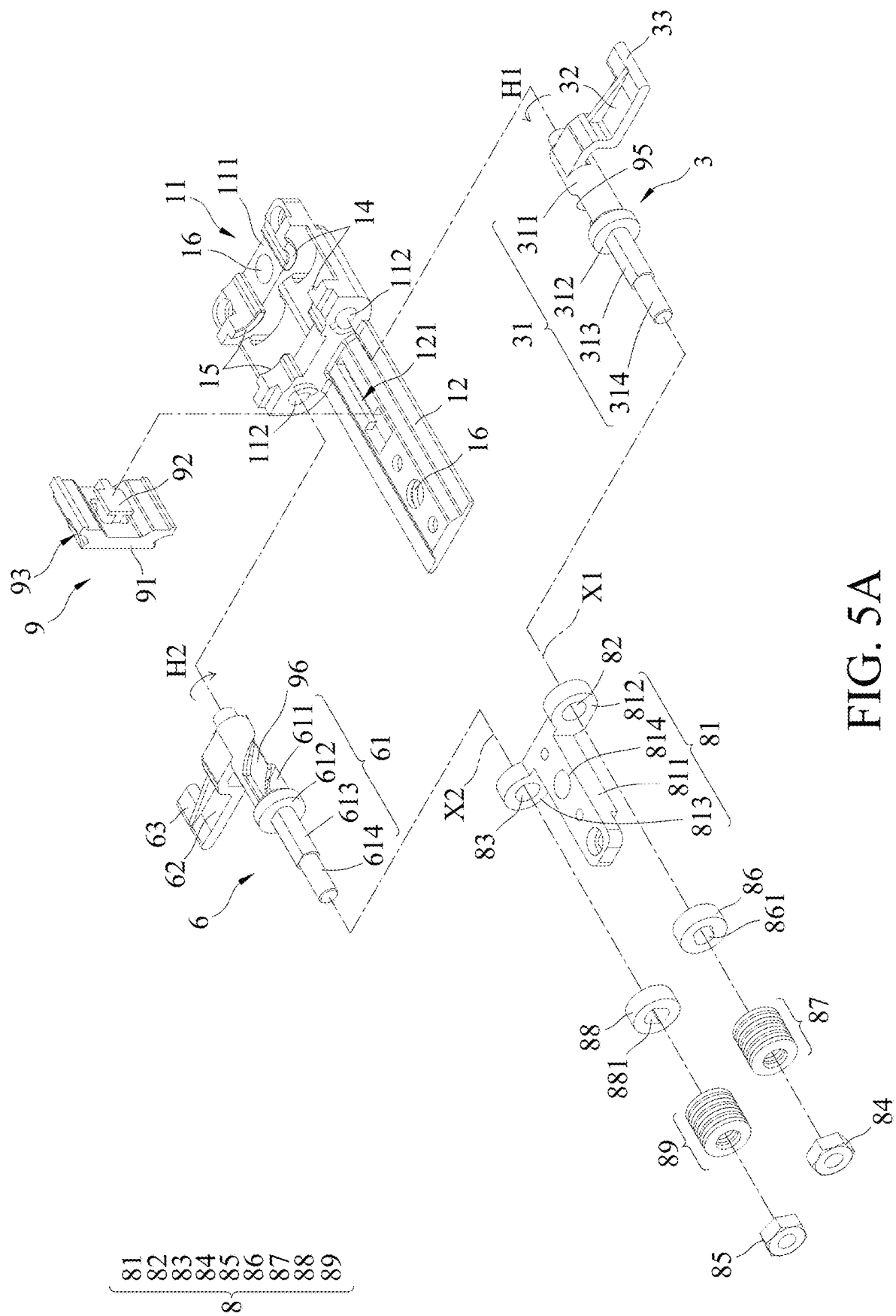
FIG. 5A is a schematic exploded view of different viewing angles of a central base, the first transmission member, the second transmission member, a torque module and a synchronous module of the foldable electronic device according to the present disclosure.
Figure 7:
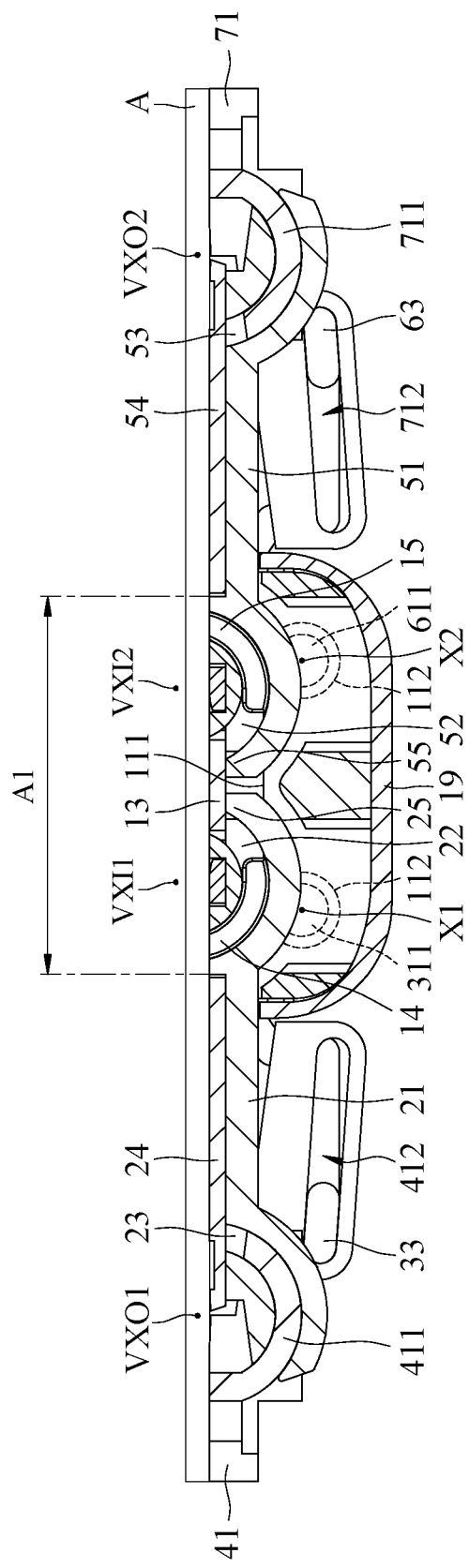
FIG. 7 is a schematic partial cross-sectional view of the foldable electronic device according to the present disclosure.
Figure 9:
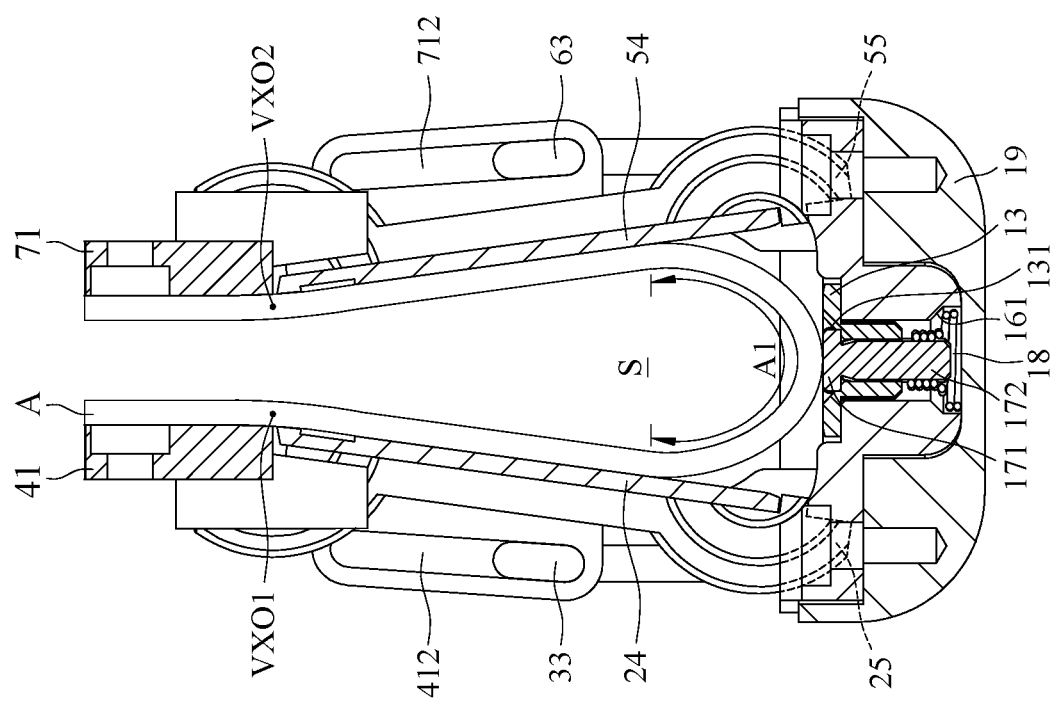
FIG. 9 is a schematic partial cross-sectional view of the foldable electronic device according to the present disclosure in a folded state.

Please refer to FIG. 3, FIG. 5A and FIG. 7 at the same time, the central base 1 includes a body portion 11, a track portion 12, a lifting plate 13, two first inner arc-shaped sliders 14, two second inner arc-shaped sliders 15, two concave holes 16, two screws 17, two elastic members 18 and a shell 19. The body portion 11 is roughly in the shape of a block and has an upper surface 111 and two shaft holes 112, and the shaft holes 112 are recessed along the first axis X1 and the second axis X2 respectively. The track portion 12 is roughly in the shape of a plate and is formed by extending outward from the body portion 11, and has a track groove 121 extending parallel to the first axis X1 and the second axis X2. The lifting plate 13 is roughly rectangular, which can be movably disposed on the upper surface 111 of the body portion 11, and can be transformed between a highest position (as shown in FIG. 7) and a lowest position (as shown in FIG. 9) relatively, and has four through apertures 131 spaced apart from each other. The first inner arc-shaped sliders 14 are roughly semi-arc shaped, protruding from the body portion 11 opposite to each other and spaced apart, and adjacent to one side of the body portion 11 (i.e., adjacent to one side of the first panel body 4), and its axis can be defined as the first inner virtual axis VXI1. The second inner arc-shaped sliders 15 are roughly semi-arc shaped, protruding from the body portion 11 opposite to each other and spaced apart, and adjacent to the other side of the body portion 11 (i.e., adjacent to one side of the second panel body 7), and are spaced apart from the first inner arc-shaped sliders 14, and its axis can be defined as the second inner virtual axis VXI2.

Please refer to FIG. 9, the concave holes 16 are respectively recessed and formed on the body portion 11 and the track portion 12, and each of the concave holes 16 has a stepped section 161. The screws 17 respectively have a screw head 171 and a screw rod 172 connected to each other, wherein the cross-sectional area of the screw head 171 is larger than the cross-sectional area of the screw rod 172, the screw head 171 abuts against the top surface of the lifting plate 13, and the screw rod 172 passes through the through aperture 131. The elastic members 18 are respectively disposed in the concave holes 16, one end of the elastic member 18 is connected to the screw rod 172, the other end of the elastic member 18 abuts against the stepped section 161, and the elastic members 18 constantly provide an elastic force, wherein the elastic force can pull the screw rods 172 and make the screw heads 171 pull the lifting plate 13, so that the lifting plate 13 tends to settle/sink toward the lowest position. In other words, when the lifting plate 13 moves from the lowest position to the highest position, one end of the elastic member 18 is limited by the stepped section 161, and the other end of the elastic member 18 is pulled by the screw rod 172 along with the movement of the lifting plate 13 and the screw head 171, so that the elastic member 18 is stretched, and the elastic force gradually increases; otherwise the elastic member 18 rebounds and resets, and the elastic force gradually decreases. In an embodiment, the elastic member 18 is a tension spring. The shell 19 covers the bottom and two sides of the body portion 11.

Figure 4:
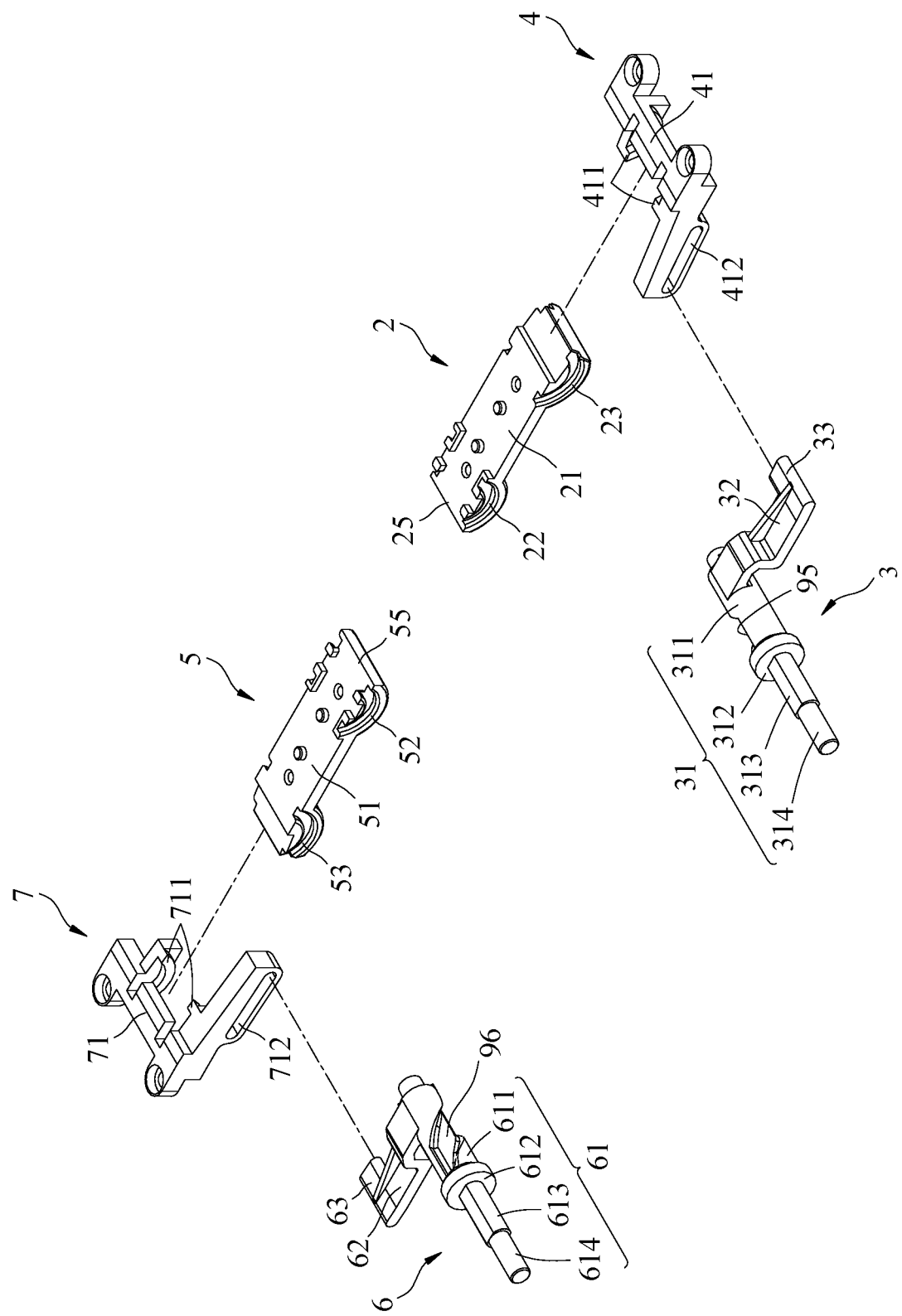
FIG. 4 is a schematic exploded view of different viewing angles of a first wing member, a first carrying member, a first transmission member, a second wing member, a second carrying member and a second transmission member of the foldable electronic device according to the present disclosure.
Figure 6:
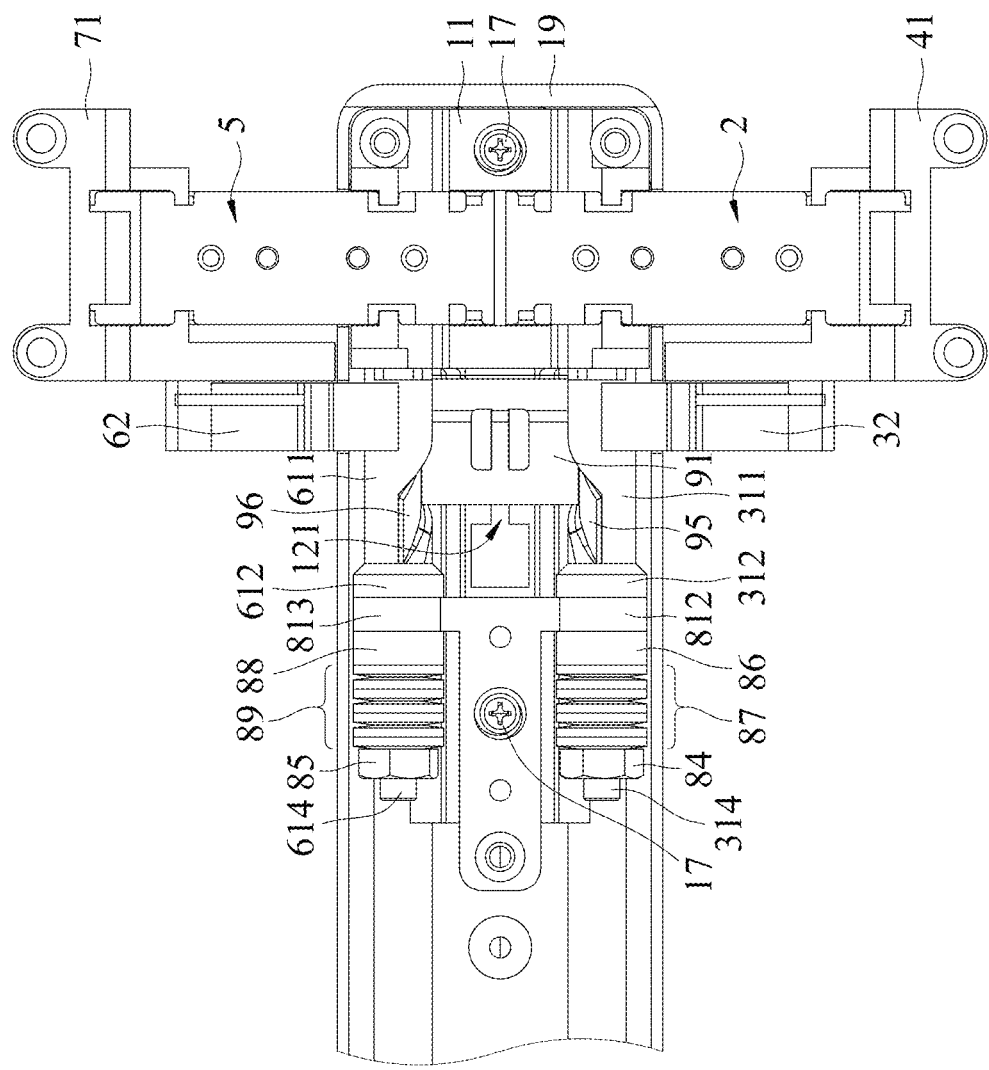
FIG. 6 is a schematic top view of some elements of the foldable electronic device according to the present disclosure in an unfolded state.

Please refer to FIG. 4, FIG. 5A and FIG. 6, the first wing member 2 includes a first wing body 21, two first inner arc-shaped slideways 22, two first outer arc-shaped slideways 23, a first supporting plate 24 and a first abutting portion 25. The first wing body 21 is roughly rectangular, wherein the first inner arc-shaped slideways 22 are recessed and formed on opposite sides of the first wing body 21 adjacent to the body portion 11 and spaced apart, and are respectively provided for sliding by the first inner arc-shaped sliders 14, whereby the first wing member 2 can pivot relative to the body portion 11 with the first inner virtual axis VXI1 as the center. The first outer arc-shaped slideways 23 are recessed and formed on opposite sides of the first wing body 21 away from the body portion 11 and spaced apart, and are spaced apart from the first inner arc-shaped slideways 22, and its axis can be defined as the first outer virtual axis VXO1. The first supporting plate 24 is roughly rectangular, disposed on the top surface of the first wing body 21, and adjacent to one side of opposite sides of the lifting plate 13. The first abutting portion 25 is formed on one side of the first wing body 21 adjacent to the body portion 11, and is adjacent to the first inner arc-shaped slideway 22 and exposed from the first supporting plate 24.

The first transmission member 3 includes a first rod 31, a first extending plate 32 and a first straight slider 33 integrally formed. The first rod 31 has a first rod body 311, a first blocking portion 312, a first extension post 313 and a first locking post 314, wherein one end of the first rod body 311 is pivotally connected to the shaft hole 112 along the first axis X1, and the first blocking portion 312 is formed on the other end of the first rod body 311, wherein the first extension post 313 is formed to extend outward from the first blocking portion 312 along the first axis X1, has a cross-sectional area smaller than the cross-sectional area of the first blocking portion 312, and has a non-circular cross-section. The first locking post 314 is formed to extend outward from the first extension post 313 along the first axis X1, has a cross-sectional area smaller than the cross-sectional area of the first extension post 313, and has a circular cross-section. The first extending plate 32 is formed to extend outwards from the first rod body 311 along the radial direction of the first axis X1, and the first straight slider 33 is formed by extending outward from the first extending plate 32 along a direction parallel to the first axis X1, that is, both sides of the first extending plate 32 are respectively connected to the first rod body 311 and the first straight slider 33.

The first panel body 4 comprises a first carrying member 41 and a first panel shell 42, wherein the first carrying member 41 has two first outer arc-shaped sliders 411 and a first straight sliding groove 412, wherein the first outer arc-shaped sliders 411 are opposite to each other and spaced apart, and are slidably disposed on the first outer arc-shaped slideways 23 respectively, whereby the first carrying member 41 can pivot relative to the first wing member 2 about the first outer virtual axis VXO1. The first straight sliding groove 412 extends roughly perpendicular to the first axis X1, and is linearly slidable for the first straight slider 33 therein. The first panel shell 42 is roughly in the shape of a square, fixed on the first carrying member 41 and coplanar with the first supporting plate 24. In addition, the first panel body 4 further comprises related electronic elements, but since they are relatively irrelevant to the folding action, details will not be repeated here.

The second wing member 5 includes a second wing body 51, two second inner arc-shaped slideways 52, two second outer arc-shaped slideways 53, a second supporting plate 54 and a second abutting portion 55. The second wing body 51 is roughly rectangular, wherein the second inner arc-shaped slideways 52 are recessed and formed on opposite sides of the second wing body 51 adjacent to the body portion 11 and spaced apart, and are respectively provided for sliding by the second inner arc-shaped sliders 15, whereby the second wing member 5 can pivot relative to the body portion 11 with the second inner virtual axis VXI2 as the center. The second outer arc-shaped slideways 53 are recessed and formed on opposite sides of the second wing body 51 away from the body portion 11 and spaced apart, and are spaced apart from the second inner arc-shaped slideways 52, and its axis can be defined as the second outer virtual axis VXO2.

The second supporting plate 54 is roughly rectangular, disposed on the top surface of the second wing body 51, and is adjacent to the other side of two opposite sides of the lifting plate 13. The second abutting portion 55 is formed on one side of the second wing body 51 adjacent to the body portion 11, and is adjacent to the second inner arc-shaped slideway 52 and exposed from the second supporting plate 54, and corresponds to the first abutting portion 25.

The second transmission member 6 is spaced apart from the first transmission member 3, and includes a second rod 61, a second extending plate 62 and a second straight slider 63 integrally formed. The second rod 61 has a second rod body 611, a second blocking portion 612, a second extension post 613 and a second locking post 614, wherein one end of the second rod body 611 is pivotally connected to the shaft hole 112 along the second axis X2, and the second blocking portion 612 is formed on the other end of the second rod body 611, wherein the second extension post 613 is formed to extend outward from the second blocking portion 612 along the second axis X2, has a cross-sectional area smaller than the cross-sectional area of the second blocking portion 612, and has a non-circular cross-section. The second locking post 614 is formed to extend outward from the second extension post 613 along the second axis X2, has a cross-sectional area smaller than the cross-sectional area of the second extension post 613, and has a circular cross-section. The second extending plate 62 is formed to extend outwards from the second rod body 611 along the radial direction of the second axis X2, and the second straight slider 63 is formed by extending outward from the second extending plate 62 along a direction parallel to the second axis X2, that is, both sides of the second extending plate 62 are respectively connected to the second rod body 611 and the second straight slider 63.

The second panel body 7 is disposed opposite to the first panel body 4, and comprises a second carrying member 71 and a second panel shell 72, wherein the second carrying member 71 has two second outer arc-shaped sliders 711 and a second straight sliding groove 712, wherein the second outer arc-shaped sliders 711 are opposite to each other and spaced apart, and are slidably disposed on the second outer arc-shaped slideways 53 respectively, whereby the second carrying member 71 can pivot relative to the second wing member 5 about the second outer virtual axis VXO2. The second straight sliding groove 712 extends roughly perpendicular to the second axis X2, and is linearly slidable for the second straight slider 63 therein. The second panel shell 72 is roughly in the shape of a square, fixed on the second carrying member 71 and coplanar with the second supporting plate 54. Similarly, the second panel body 7 further comprises related electronic elements, but since they are relatively irrelevant to the folding action, details will not be repeated here.

The torque module 8 comprises a fixed base 81, a first shaft hole 82, a second shaft hole 83, a first nut 84, a second nut 85, a first stop washer 86, a plurality of first bowl-shaped washers 87, a second stop washer 88 and a plurality of second bowl-shaped washers 89. The fixed base 81 has a base body 811, a first wing portion 812, a second wing portion 813 and a penetrating hole 814, wherein the base body 811 is roughly rectangular, and is disposed on the track portion 12 and exposes the track groove 121, and is spaced apart from the body portion 11. The first wing portion 812 and the second wing portion 813 respectively extend outward from opposite sides of the base body 811 and are spaced apart from each other, and one side of the first wing portion 812 abuts against the first blocking portion 312, and one side of the second wing portion 813 abuts against the second blocking portion 612. The penetrating hole 814 penetrates from the top to the bottom of the base body 811, and is in communication with the through aperture 131 and the concave hole 16 correspondingly, and accommodates the screw rod 172 therein.

The first shaft hole 82 is formed through the first wing portion 812 along the first axis X1, and is used for the pivot connection of the first extension post 313, and has a cross-sectional area larger than the cross-sectional area of the first extension post 313. The second shaft hole 83 is formed through the second wing portion 813 along the second axis X2, and is used for the pivot connection of the second extension post 613, and has a cross-sectional area larger than the cross-sectional area of the second extension post 613. The first nut 84 is screwed to the first locking post 314, and the second nut 85 is screwed to the second locking post 614.

The first stop washer 86 has a first through hole 861, and the first extension post 313 penetrates through the first through hole 861, wherein the cross-section of the first through hole 861 matches the cross-section of the first extension post 313 and is a non-circular cross-section, so that the first stop washer 86 is sleeved on the first extension post 313 and can move together with the first extension post 313. The first bowl-shaped washers 87 are sleeved on the first extension post 313 and are located between the first nut 84 and the first stop washer 86, and do not move together with the first extension post 313, and constantly provide a first elastic force, wherein the first elastic force tends to make the first stop washer 86 abut against the other side of the first wing portion 812, and the magnitude of the first elastic force can be changed by adjusting the distance between the first nut 84 and the first wing portion 812. The second stop washer 88 has a second through hole 881, and the second extension post 613 penetrates through the second through hole 881, wherein the cross-section of the second through hole 881 matches the cross-section of the second extension post 613 and is a non-circular cross-section, so that the second stop washer 88 is sleeved on the second extension post 613 and can move together with the second extension post 613. The second bowl-shaped washers 89 are sleeved on the second extension post 613 and are located between the second nut 85 and the second stop washer 88, and do not move together with the second extension post 613, and constantly provide a second elastic force, wherein the second elastic force tends to make the second stop washer 88 abut against the other side of the second wing portion 813, and the magnitude of the second elastic force can be changed by adjusting the distance between the second nut 85 and the second wing portion 813.

Figure 5B:
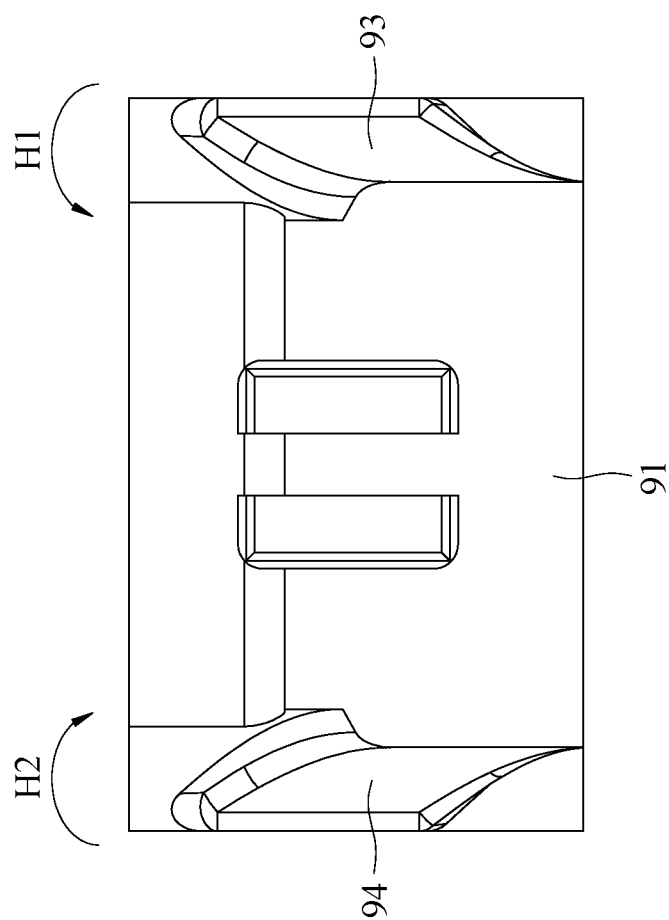
FIG. 5B is a schematic top view of the synchronous module of the foldable electronic device according to the present disclosure.

Please refer to FIG. 5A and FIG. 5B at the same time, the synchronous module 9 comprises a synchronous slider body 91, a limiting member 92, a first helical protrusion 93, a second helical protrusion 94, a first helical groove 95 and a second helical groove 96, wherein the synchronous slider body 91 is slidably disposed between the first transmission member 3 and the second transmission member 6 and on the track portion 12, and is connected to the first transmission member 3 and the second transmission member 6. The limiting member 92 extends outward from the bottom surface of the synchronous slider body 91 and is accommodated in the track groove 121, so that the synchronous slider body 91 can move along the track groove 121. The first helical protrusion 93 is formed on one of two opposite side surfaces of the synchronous slider body 91 along a first helical direction H1. The second helical protrusion 94 is formed on the other one of the two opposite side surfaces of the synchronous slider body 91 along a second helical direction H2. The first helical groove 95 is recessed and formed on the first rod body 311 along the first helical direction H1, and the first helical protrusion 93 matches and accommodated in the first helical groove 95. The second helical groove 96 is recessed and formed on the second rod body 611 along the second helical direction H2, and the second helical protrusion 94 matches and accommodated in the second helical groove 96. In an embodiment, the first helical direction H1 and the second helical direction H2 are opposite. In other embodiments, the first helical groove 95 and the second helical groove 96 may also be recessed and formed on opposite sides of the synchronous slider body 91 respectively, and the first helical protrusion 93 and the second helical protrusion 94 can also be formed on the first rod body 311 and the second rod body 611 respectively, that is, swapping the arrangement can also achieve the same effect.

The flexible screen A is disposed on the first panel body 4, the second panel body 7, the first wing member 2 and the second wing member 5, and comprises a bendable area A1, wherein the bendable area A1 roughly corresponds to the lifting plate 13, the first supporting plate 24 and the second supporting plate 54.

Figure 8:
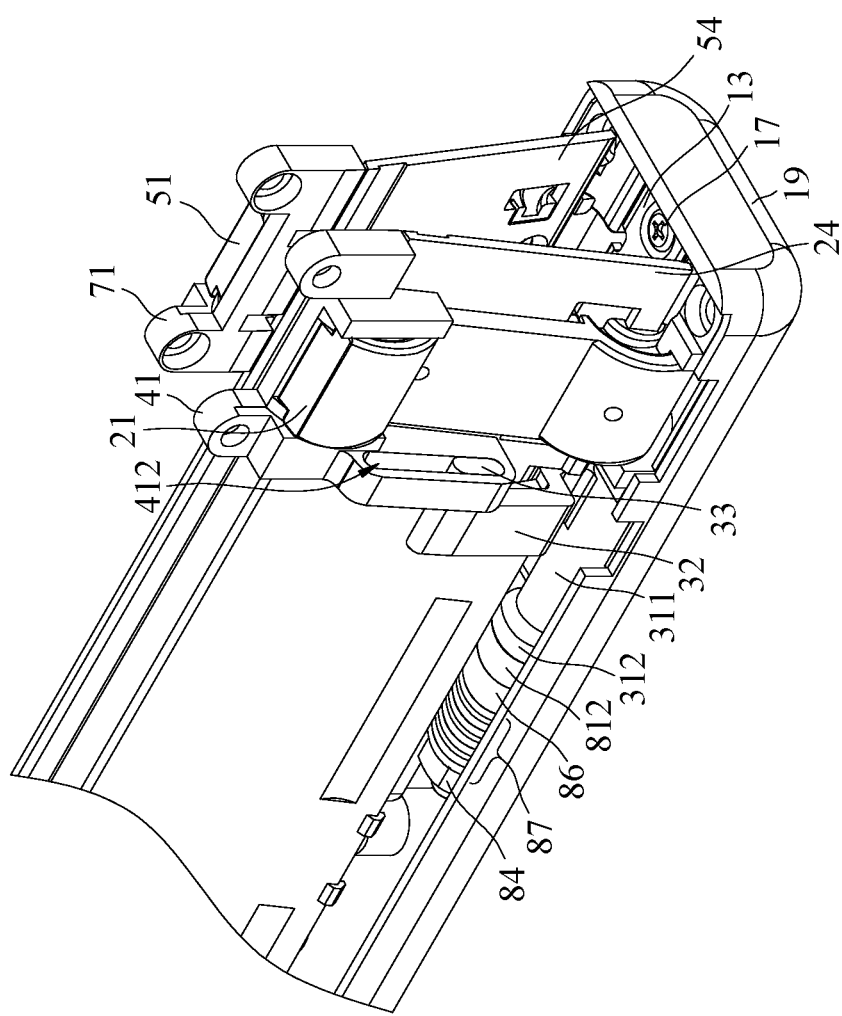
FIG. 8 is a schematic partial view of the foldable electronic device according to the present disclosure in a folded state.
Figure 10:
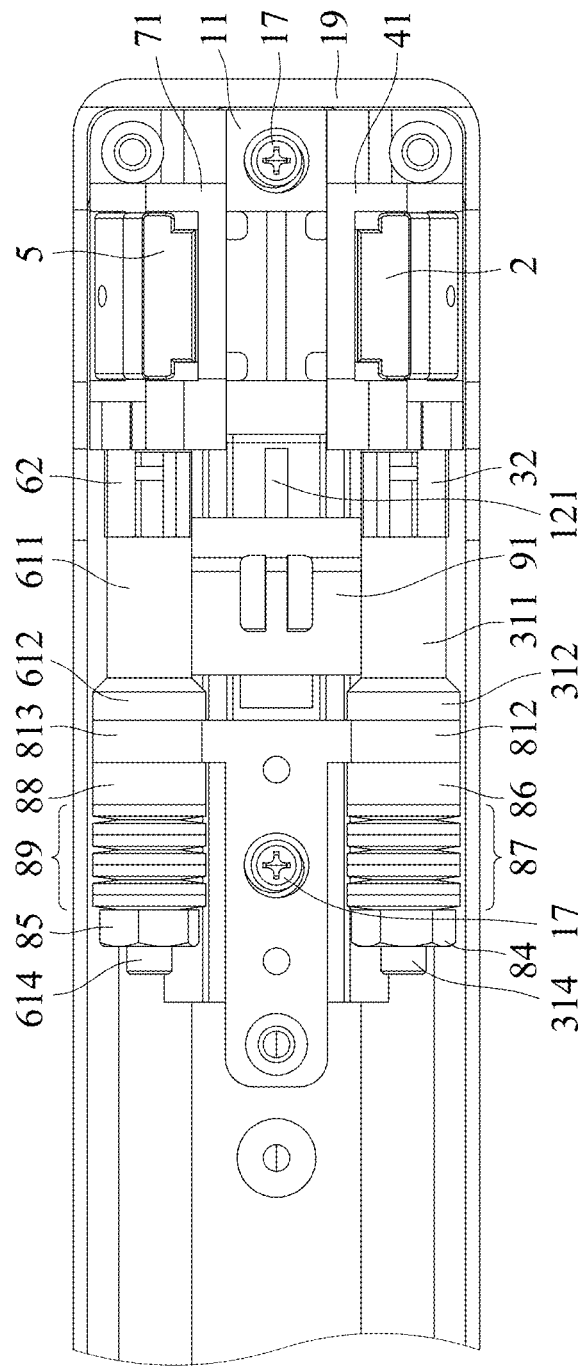
FIG. 10 is a schematic top view of some elements of the foldable electronic device according to the present disclosure in a folded state.

The actuation of the foldable electronic device 1000 of the present disclosure is described below. The first panel body 4 and the second panel body 7 can be transformed between an unfolded state (as shown in FIG. 1, FIG. 6 and FIG. 7) and a folded state (as shown in FIG. 8, FIG. 9 and FIG. 10). When the first panel body 4 and the second panel body 7 are in the unfolded state, the flexible screen A is flattened, wherein the first supporting plate 24, the second supporting plate 54 and the lifting plate 13 are coplanar and jointly support the bendable area A1, wherein the lifting plate 13 is spaced apart from the upper surface 111, and the first abutting portion 25 and the second abutting portion 55 jointly abut against the lifting plate 13 at the highest position, and at this time, the first carrying member 41 and the second carrying member 71 are substantially 180 degrees apart.

When the first panel body 4 and the second panel body 7 are transformed from the unfolded state to the folded state, the first wing member 2 and the second wing member 5 pivot relative to the body portion 11 with the first inner virtual axis VXI1 and the second inner virtual axis VXI2 as the center respectively and approach each other gradually (i.e., a state where the first supporting plate 24, the second supporting plate 54 and the lifting plate 13 are coplanar is gradually changed to a state where the first supporting plate 24 and the second supporting plate 54 are respectively oblique to the lifting plate 13), and at this time, the first carrying member 41 and the second carrying member 71 also pivot and move relative to the first wing member 2 and the second wing member 5 with the first outer virtual axis VXO1 and the second outer virtual axis VXO2 as the center respectively, and the first straight slider 33 and the second straight slider 63 slide linearly in the first straight sliding groove 412 and the second straight sliding groove 712 respectively (slide from one end of the sliding groove to the other end), and at the same time, the first rod 31 and the second rod 61 are driven to pivot synchronously and reversely with the first axis X1 and the second axis X2 as the center respectively, and the first helical protrusion 93 and the second helical protrusion 94 also slide along the first helical groove 95 and the second helical groove 96 respectively, and the synchronous slider body 91 is driven to move toward the fixed base 81 along the track groove 121. During the transformation of the first panel body 4 and the second panel body 7 from the unfolded state to the folded state, the first rod 31 and the second rod 61 are synchronously and reversely pivoted to cause the first blocking portion 312 and the first stop washer 86 to simultaneously generate friction on opposite sides of the first wing portion 812, and the second blocking portion 612 and the second stop washer 88 also simultaneously generate friction on opposite sides of the second wing portion 813, so that the first carrying member 41 and the second carrying member 71 can stop at any arbitrary angle at any relative position, and the arbitrary angle is between 0 and 180 degrees.

Please refer to FIG. 8, FIG. 9 and FIG. 10, when the first panel body 4 and the second panel body 7 are transformed to the folded state, the first abutting portion 25 and the second abutting portion 55 are away from the lifting plate 13 (i.e., no longer abut against the lifting plate 13), so that the lifting plate 13 loses the support and is pulled by the elastic force of the elastic members 18 and settles/sinks to the lowest position and in contact with the upper surface 111. At this time, the first supporting plate 24 and the second supporting plate 54 are respectively oblique to the body portion 11, one end of the first supporting plate 24 adjacent to the first carrying member 41 and one end of the second supporting plate 54 adjacent to the second carrying member 71 are close to each other, and the first carrying member 41 and the second carrying member 71 are substantially 0 degrees apart, wherein the bendable area A1 of the flexible screen A bends, and the first wing member 2, the second wing member 5 and the lifting plate 13 jointly define an yielding space S for accommodating the bendable area A1. In other words, the lifting plate 13, the first supporting plate 24 and the second supporting plate 54 can be roughly in the shape of an inverted triangle, so that the bendable area A1 can be partially attached to the lifting plate 13, the first supporting plate 24 and the second supporting plate 54 and is roughly semicircular, such that the part of the flexible screen A attached to the lifting plate 13, the first wing member 2, the first carrying member 41, the second wing member 5 and the second carrying member 71 is roughly in the shape of a water drop.

In summary, in the foldable electronic device of the present disclosure, the first wing member and the second wing member can pivot relative to the central base, wherein the first carrying member and the second carrying member can pivot relative to the first wing member and the second wing member respectively, and drive the first transmission member and the second transmission member to linearly slide relative to the first carrying member and the second carrying member respectively, so as to let the first rod and the second rod reverse synchronously, so that the lifting plate, the first wing member and the second wing member jointly support the bendable area of the flexible screen when the first panel body and the second panel body are in the unfolded state, and the lifting plate settles and forms an yielding space together with the first wing member and the second wing member when the first panel body and the second panel body are in the folded state, thereby effectively creating a large enough yielding space enough to accommodate the bendable area without increasing the overall thickness.

What is claimed is:

1. A foldable electronic device, comprising:
a central base including a body portion, a track portion, a lifting plate, at least one first inner arc-shaped slider and at least one second inner arc-shaped slider, wherein the track portion is formed by extending outward from the body portion, and the first inner arc-shaped slider and the second inner arc-shaped slider are respectively formed on the body portion and spaced apart from each other, and wherein the lifting plate is movably disposed on the body portion and is able to transform between a highest position and a lowest position relatively;
a torque module disposed on the track portion;
a first wing member including at least one first inner arc-shaped slideway and at least one first outer arc-shaped slideway, wherein the first inner arc-shaped slider is slidably disposed on the first inner arc-shaped slideway, whereby the first wing member is able to pivot relative to the body portion with a first inner virtual axis as a center;
a first transmission member pivotally connected to the torque module and the body portion;
a first panel body including a first carrying member having at least one first outer arc-shaped slider, wherein the first carrying member is able to linearly slide relative to the first transmission member, and the first outer arc-shaped slider is slidably disposed on the first outer arc-shaped slideway, whereby the first carrying member is able to pivot relative to the first wing member about a first outer virtual axis;
a second wing member including at least one second inner arc-shaped slideway and at least one second outer arc-shaped slideway, wherein the second inner arc-shaped slider is slidably disposed on the second inner arc-shaped slideway, whereby the second wing member is able to pivot relative to the body portion with a second inner virtual axis as a center;
a second transmission member pivotally connected to the torque module and the body portion and spaced apart from the first transmission member;
a second panel body including a second carrying member having at least one second outer arc-shaped slider, wherein the second carrying member is able to linearly slide relative to the second transmission member, and the second outer arc-shaped slider is slidably disposed on the second outer arc-shaped slideway, whereby the second carrying member is able to pivot relative to the second wing member about a second outer virtual axis;
a synchronous module including a synchronous slider body slidably disposed between the first transmission member and the second transmission member, wherein the first transmission member and the second transmission member are respectively connected to the synchronous slider body, and the synchronous slider body is able to drive the first transmission member and the second transmission member to rotate synchronously and reversely when the synchronous slider body slides; and
a flexible screen disposed on the first panel body, the second panel body, the first wing member and the second wing member, and including a bendable area;
wherein the first panel body and the second panel body are able to transform between an unfolded state and a folded state, wherein when the first panel body and the second panel body are in the unfolded state, the flexible screen is flattened, the lifting plate is positioned at the highest position, and the first wing member, the second wing member and the lifting plate jointly support the bendable area, wherein when the first panel body and the second panel body are in the folded state, the bendable area of the flexible screen bends, the lifting plate is positioned at the lowest position, and the first wing member, the second wing member and the lifting plate jointly define a yielding space for accommodating the bendable area.

2. The foldable electronic device of claim 1, wherein the synchronous module further includes a first helical protrusion, a second helical protrusion, a first helical groove and a second helical groove, wherein the first helical protrusion is matched with and accommodated in the first helical groove, and the second helical protrusion is matched with and accommodated in the second helical groove.

3. The foldable electronic device of claim 2, wherein the first helical groove is recessedly formed on the first transmission member along a first helical direction, the second helical groove is recessedly formed on the second transmission member along a second helical direction, and the first helical protrusion and the second helical protrusion are respectively formed on two opposite sides of the synchronous slider body.

4. The foldable electronic device of claim 3, wherein the first helical direction is opposite to the second helical direction.

5. The foldable electronic device of claim 4, wherein the first transmission member includes a first rod, a first extending plate and a first straight slider which are integrally formed, the first rod is pivotally connected to the torque module and the body portion along a first axis, the first extending plate is formed to extend outwards from the first rod along a radial direction of the first axis, and the first straight slider is formed by extending outward from the first extending plate along a direction parallel to the first axis, the first carrying member has a first straight sliding groove extending substantially perpendicular to the first axis, and the first straight slider is slidably disposed in the first straight sliding groove, and wherein the second transmission member includes a second rod, a second extending plate and a second straight slider which are integrally formed, the second rod is pivotally connected to the torque module and the body portion along a second axis, the second extending plate is formed to extend outwards from the second rod along a radial direction of the second axis, the second straight slider is formed by extending outward from the second extending plate along a direction parallel to the second axis, the second carrying member has a second straight sliding groove extending substantially perpendicular to the second axis, and the second straight slider is slidably disposed in the second straight sliding groove.

6. The foldable electronic device of claim 5, wherein the first axis, the first inner virtual axis, the first outer virtual axis, the second axis, the second inner virtual axis and the second outer virtual axis are parallel to each other.

7. The foldable electronic device of claim 6, wherein the torque module comprises a fixed base, a first shaft hole and a second shaft hole, and wherein the fixed base has a first wing portion and a second wing portion, the first shaft hole is formed through the first wing portion along the first axis, and the second shaft hole is formed through the second wing portion along the second axis.

8. The foldable electronic device of claim 7, wherein the first rod has a first rod body, a first blocking portion and a first extension post, the first blocking portion is formed at one end of the first rod body and abuts against the first wing portion, the first extension post extends outward from the first blocking portion and passes through the first shaft hole, and a cross-sectional area of the first blocking portion is larger than a cross-sectional area of the first extension post, and wherein the second rod has a second rod body, a second blocking portion and a second extension post, the second blocking portion is formed at one end of the second rod body and abuts against the second wing portion, the second extension post extends outward from the second blocking portion and passes through the second shaft hole, and a cross-sectional area of the second blocking portion is larger than a cross-sectional area of the second extension post.

9. The foldable electronic device of claim 8, wherein the torque module further includes a first stop washer, a plurality of first bowl-shaped washers, a second stop washer and a plurality of second bowl-shaped washers, wherein the first stop washer is sleeved on the first extension post and moves together with the first extension post, the first bowl-shaped washers are sleeved on the first extension post and jointly and constantly provide a first elastic force, and the first elastic force tends to make the first stop washer abut against the first wing portion, and wherein the second stop washer is sleeved on the second extension post and moves together with the second extension post, the second bowl-shaped washers are sleeved on the second extension post and jointly and constantly provide a second elastic force, and the second elastic force tends to make the second stop washer abut against the second wing portion.

10. The foldable electronic device of claim 9, wherein when the first panel body and the second panel body are in the unfolded state, the first carrying member and the second carrying member are substantially 180 degrees apart, wherein when the first panel body and the second panel body are in the folded state, the first carrying member and the second carrying member are substantially 0 degree apart, and wherein when the first panel body and the second panel body are transformed between the unfolded state and the folded state, the first transmission member and the second transmission member reverse synchronously, so that the first blocking portion and the first stop washer simultaneously generate friction on opposite sides of the first wing portion, and the second blocking portion and the second stop washer simultaneously generate friction on opposite sides of the second wing portion, such that the first carrying member and the second carrying member are able to stop at any relative position and sandwich an angle between 0 and 180 degrees.

11. The foldable electronic device of claim 10, wherein the central base further includes a track groove formed through the track portion, the synchronous module further includes a limiting member formed on a bottom surface of the synchronous slider body and accommodated in the track groove, such that the synchronous module is able to move along the track groove.

12. The foldable electronic device of claim 1, wherein the first wing member further includes a first supporting plate, the second wing member further includes a second supporting plate, and the body portion has an upper surface, wherein when the first panel body and the second panel body are in the unfolded state, the first supporting plate, the second supporting plate and the lifting plate are coplanar, and the lifting plate is spaced apart from the upper surface, and wherein when the first panel body and the second panel body are in the folded state, the lifting plate is in contact with the upper surface, the first supporting plate and the second supporting plate are respectively oblique to the body portion, and one end of the first supporting plate adjacent to the first carrying member and one end of the second supporting plate adjacent to the second carrying member are close to each other.

13. The foldable electronic device of claim 12, wherein the first wing member further includes a first abutting portion adjacent to the first inner arc-shaped slideway and exposed from the first supporting plate, and the second wing member further includes a second abutting portion adjacent to the second inner arc-shaped slideway and exposed from the second supporting plate, wherein the first abutting portion and the second abutting portion jointly abut against the lifting plate at the highest position when the first carrying member and the second carrying member are in the unfolded state, and wherein the first abutting portion and the second abutting portion are away from the lifting plate when the first carrying member and the second carrying member are in the folded state.

14. The foldable electronic device of claim 13, wherein the central base further includes at least one screw and at least one elastic member, wherein the screw is clamped on the lifting plate, and the elastic member is embedded in either the body portion or the track portion, connected to the screw and constantly provides an elastic force, and wherein the elastic force pulls the screw and makes the lifting plate tend to settle towards the lowest position.

15. The foldable electronic device of claim 14, wherein the elastic member is a tension spring.

* * * * *